United States Patent [19]

Jensen et al.

[11] 4,427,421
[45] Jan. 24, 1984

[54] DEVICE FOR SEPARATING GAS OUT OF LIQUIDS

[75] Inventors: Niels D. Jensen; Kurt F. Nielsen, both of Bjerringbro, Denmark; Horst Komossa, Wittenborn, Fed. Rep. of Germany

[73] Assignee: Grundfos A/S, Bjerringbro, Denmark

[21] Appl. No.: 298,386

[22] Filed: Sep. 1, 1981

[30] Foreign Application Priority Data

Sep. 5, 1980 [DE] Fed. Rep. of Germany ....... 3033450

[51] Int. Cl.³ .............................................. B01D 19/00
[52] U.S. Cl. ...................................... 55/52; 55/203
[58] Field of Search ................................. 55/201–207, 55/52; 210/304, 311

[56] References Cited

U.S. PATENT DOCUMENTS

| | | | |
|---|---|---|---|
| 1,734,507 | 11/1929 | Westling et al. | 55/201 X |
| 2,018,901 | 10/1935 | Rush | 55/206 |
| 3,003,580 | 10/1961 | Lanning | 55/52 X |
| 3,151,961 | 10/1964 | Blackmore et al. | 55/205 |
| 3,771,287 | 11/1973 | Sunderland | 55/201 X |
| 3,771,290 | 11/1973 | Stethem | 55/205 |
| 3,912,622 | 10/1975 | Bolton et al. | 210/304 X |

FOREIGN PATENT DOCUMENTS

| | | | |
|---|---|---|---|
| 534904 | 10/1931 | Fed. Rep. of Germany | 55/204 |
| 1619887 | 12/1978 | Fed. Rep. of Germany | 55/204 |
| 543427 | 3/1977 | U.S.S.R. | 55/204 |
| 556839 | 5/1977 | U.S.S.R. | 55/204 |

*Primary Examiner*—Robert H. Spitzer
*Attorney, Agent, or Firm*—Michael N. Meller

[57] ABSTRACT

In a device having a gas separation chamber situated between an entry pipe for a gas-containing liquid and an exit pipe for de-gassed liquid wherein a twisting motion is supplied to the gas-containing liquid in the chamber so that gas in the centrifugal field of flow is forced toward the center of rotation which falls on the center line of the chamber and passed to an outlet opening while de-gassed liquid flows away to the exit pipe at the circumference of the chamber, the improvement comprises a stationary sieve tube arranged coaxially in the chamber wherein the upper opening of the sieve tube is directed towards the outlet opening for the gas and connects the sieve chamber in primary connection with the exit pipe, which has a common center line with the entry pipe. The sieve piercings form a secondary connection to the exit pipe. The sieve tube is preferably installed at an angle of 45° to the field of gravity of the earth.

19 Claims, 2 Drawing Figures

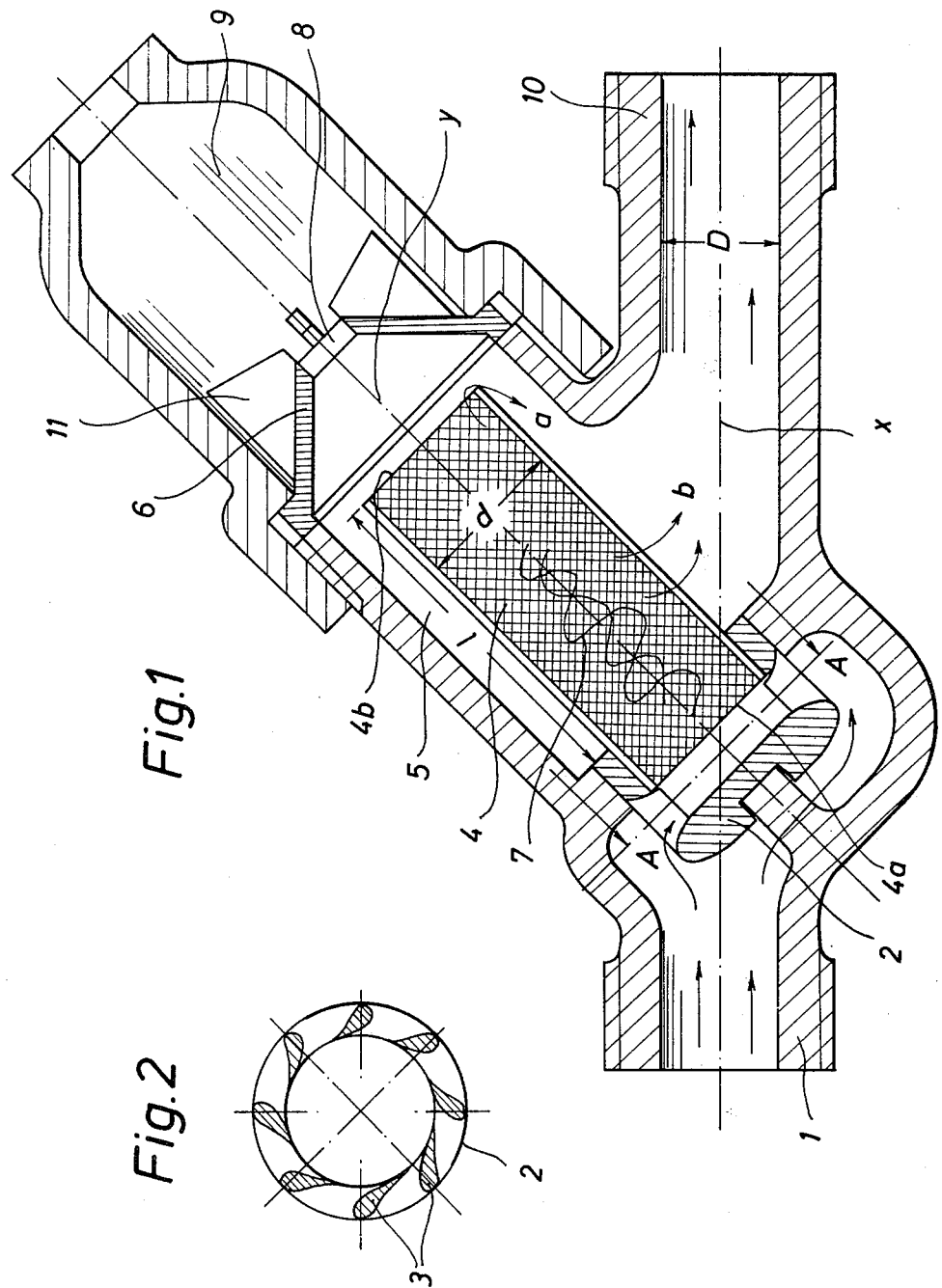

DEVICE FOR SEPARATING GAS OUT OF LIQUIDS

BACKGROUND OF THE INVENTION

The invention relates to a device for separating gas bubbles from a liquid having a separator chamber situated between its entry and exit pipes, to which chamber the liquid-gas mixture is fed with a twisting motion, whereby the gas bubbles are forced in the centrifugal field of the flow towards the center of rotation, which falls into the center line of the chamber, and pass to an outlet opening, while the de-gassed liquid flows away to the exit pipe at the circumference of the chamber.

In many pump-operated installations, such as heating and cooling water installations, the circulator pump has to convey a more or less large proportion of gas with the liquid. This gas can lead to difficulties and faults both in the installation and in the pump. This applies especially in the case of hot water central heating systems, where air situated in the system is the cause of many problems. Of these problems only the most important are to be mentioned here, namely noise generation, the failure of unfavorably situated heaters, the corrosion problem and finally also the possible failure of the circulator pump due to dry running of the bearings.

Thus in correct operation it is necessary to remove the gas or air out of the circuit. The devices used for this purpose are installed in the relevant installation either as an independent construction unit or as a component of the circulator pump. Their effect is based upon gravity or centrifugal force.

Most of the gas separators known hitherto do not work satisfactorily, because physical laws have remained neglected in their design or no clear separation was effected separation chamber and the gas collection chamber. It is also a great disadvantage that their function is dependent upon position, that is to say that to this extent the user of separators is limited in the manner of installation. Since pump installations moreover are frequently operated with variable delivery flow, neither the gravity separator nor the centrifugal separator is to be regarded as the optimum solution to the problem. Gravity separators have good separation degrees at low delivery currents and poor separation degrees at high throughput; centrifugal separators display the contrary behavior.

The invention is based upon the problem of eliminating the described drawbacks and producing a gas separator which even with fluctuating throughput has an equally good degree of separation within wide limits and furthermore is capable of functioning equally in a vertical or a horizontal position of installation.

SUMMARY OF THE INVENTION

According to the invention this problem is solved in that in the initially mentioned separator device the liquid-gas mixture is introduced into the lower opening of a sieve tube arranged coaxially in the chamber, the upper opening of which tube is directed towards the outlet opening and connects the sieve tube chamber by primary connection with the exit pipe, while the sieve tube piercings form a secondary connection to the outlet pipe. Thus for the fluid passing into the entry pipe two flow paths result through the separation chamber to the outlet pipe, namely the first path for the liquid-gas mixture in the axial direction through the sieve tube and the second path for the gas-freed liquid through the openings of the sieve tube.

As is known, gas bubbles with movable defining surfaces can be guided with the aid of sieves. Spherical bubbles and elliptical bubbles occur primarily in heating installations. If the liquid-gas mixture enters the mentioned sieve tube with twisting motion, the gas bubbles are forced by the centripetal acceleration of the center of rotation, that is towards the axis of the sieve tube, and brought with the liquid to the upper outlet opening. In this case a part of the liquid flows in secondary connection through the openings of the sieve directly to the exit pipe of the separator, so that the axial component of the speed of flow in the sieve tube will decrease constantly with the flow path, while the gas bubbles striking obliquely upon the sieve surface will rebound. If the sieve tube is appropriately dimensioned the axial speed of the liquid in the region of use of the separator is less in the upper opening of the sieve tube than the buoyancy speed of the gas bubbles, so that these cannot be entrained by the liquid issuing at the top from the sieve tube and entering the exit pipe of the separator by primary connection. This is valid also in the case of the sudden major occurrence of gas, which moreover on account of the sieve tube cannot lead to a breakdown of the separator.

Moreover the device should be designed so that the center line of the separation chamber and of the sieve tube, in the case of a vertical or horizontal installation position of the separator, lies obliquely of the field of gravity of the earth. An angle of 45° to the field of gravity of the earth will preferably be selected. In this way it is possible to achieve the object that in the case of a small liquid throughput and thus a long time of sojourn of the fluid in the separation chamber, the gas bubbles are separated from the liquid by reason of buoyancy and guided by the sieve tube pass to the outlet opening, if the gas bubbles in operation come into contact with the sieve tube at all. With increasing throughput the twisting motion of the fluid and thus the centripetal acceleration increases, thus forcing the gas bubbles to the center line of the separation chamber and of the sieve tube, around which they then rise circulating to the outlet opening or into a gas-collection chamber.

Since the gas bubbles should not enter the exit pipe of the separator, as already mentioned the axial speed of the fluid in the upper opening of the sieve tube must be lower than the buoyancy speed of the gas bubbles. Moreover for the same reason the upper opening of the sieve tube must lie at the same level as or higher than the exit pipe of the separator.

Finally it should be mentioned that the separator can be combined with a gas outlet device. For this purpose above the separation chamber a space is provided in which the level control system of a separate outlet valve is accommodated. In this region the rotating movement of the fluid should be as small as possible or zero.

An example of an embodiment of the invention is illustrated in the accompanying drawing, wherein:

BRIEF DESCRIPTION OF THE DRAWING

FIG. 1 shows a section through the separator device according to the invention and FIG. 2 shows a section along the section line A—A in FIG. 1.

DETAILED DESCRIPTION

The liquid-gas mixture passes through the entry pipe 1 into the separator. It flows through the twist generating guide apparatus 2, which according to FIG. 2 comprises a plurality of blades 3 for flow guidance, into the lower opening 4a of the sieve tube 4. In place of the guide apparatus 2 as shown a spiral housing can also be used to generate the requisite twist. The sieve tube 4 lies coaxially in the center of the separation chamber 5, the cylindrical part of which is adjoined by an upwardly directed frustoconical insert 6.

Then in the centrifugal field a diagrammatically indicated gas vortex 7 develops in the sieve tube 4, passes by way of the outlet opening 8 of the insert 6 into a gas-collecting chamber 9 and is conducted away to the exterior, while the water issuing from the upper sieve tube opening 4b will pass by primary connection in the direction of the arrow a into the exit pipe 10. The water passing directly through the sieve tube 4 and flowing in the direction of the arrow b likewise contains no gas bubbles. This water also leaves the separator through the exit pipe 10.

The device as described corresponds in its flow guidance in principle to a full-flow valve and therefore has especially low coefficients of resistance. Penetration of gas bubbles into the exit pipe 10 is prevented by the sieve tube 4 lying in secondary connection to the main direction of flow, so that blocking of the separator cannot occur.

In the gas collection chamber 9 a float valve can be installed by way of which the gas is conducted away to the exterior. Moreover here any still existing twisting motion of the fluid should be interrupted. For this purpose several radially disposed ribs 11 can be provided which are connected with the insert 6.

The geometrical dimensions of the sieve tube 4 expediently are within the following limits, namely $1 \leq l/d \leq 6$ and $0.5 \leq dD \leq 2$. Here d is the internal diameter of the sieve tube 4, D the diameter of the exit pipe 10 and l the effective length of the sieve tube.

FIG. 1 shows the separator device in an installation position suitable for a horizontal conduit. The installation position for a vertical conduit results if the illustration according to FIG. 1 is rotated in the counter-clockwise direction through 90°.

In both cases the entry and exit pipes 1, 10 lie on the common center line x, while the center line y of the chamber 5 and of the sieve tube 4 lies at an angle of 45° to the field of gravity of the earth. Other angular positions would likewise be possible, although the mentioned angle of 45° is preferred, if only installation in either horizontally or vertically extending conduits comes under consideration.

In conclusion it is also pointed out that the application of the invention is not limited to gas separator devices in the form of independent construction units, since the device can also be used for example as an integrated component of a centrifugal pump. In this case the pipe 1 at the same time forms the entry pipe of the pump unit, while the pipe 10 or a corresponding passage is directed on to the pump impeller in such a way that its axis of rotation lies in an extension of the axis x.

We claim:

1. A method of separating gas from a gas containing liquid comprising the steps of passing the gas containing liquid in a twisting motion through a sieve tube in a separator chamber wherein the center line of the sieve tube and separator chamber lies at an angle of 45° to the field of gravity of the earth and the dimensions of the sieve tube are chosen so that the axial speed of the liquid in the upper opening of the sieve tube is less than the buoyancy speed of the gas bubbles whereby part of the liquid passes out of the sieve opening of the sieve tube causing the axial component of the speed of flow in the sieve tube to decrease constantly with the flow path.

2. A device for separating gas bubbles from a liquid, said device comprising an entry pipe, and an exit pipe having a common center line, a separator chamber situated between said entry pipe and said exit pipe, a twist generating means located within said chamber and a stationary sieve tube arranged coaxially in said chamber, wherein the upper opening of the sieve tube is directed towards an outlet opening for the gas and connects the sieve tube in primary connection with the exit pipe and wherein the sieve tube piercings form a secondary connection to the exit pipe, whereby a gas-containing liquid entering the exit pipe is supplied with a twisting motion, gas bubbles in the centrifugal field of flow are forced toward the center of rotation along the center line of the chamber and pass to the outlet opening, and de-gassed liquid flows to the exit pipe at the circumference of the chamber.

3. The device according to claim 2, wherein the common center line of the chamber and of the sieve tube lies at an angle of 45° to the field of gravity of the earth.

4. The device according to claim 3, wherein the inner opening of the exit pipe is arranged beneath the upper opening of the sieve tube.

5. The device according to claim 4, wherein said sieve tube is cylindrical.

6. The device according to claim 5, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

7. The device according to claim 4, further comprising an upwardly directed frustoconical insert terminating in the gas outlet opening adjoining the separation chamber and wherein said chamber is cylindrical.

8. The device according to claim 3, wherein said sieve tube is cylindrical.

9. The device according to claim 8, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

10. The device according to claim 3, further comprising an upwardly directed frustoconical insert terminating in the gas outlet opening adjoining the separation chamber and wherein said chamber is cylindrical.

11. The device according to claim 2, wherein the inner opening of the exit pipe is arranged beneath the upper opening of the sieve tube.

12. The device according to claim 11, wherein said sieve tube is cylindrical.

13. The device according to claim 12, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

14. The device according to claim 11, further comprising an upwardly directed frustoconical insert terminating in the gas outlet opening adjoining the separation chamber and wherein said chamber is cylindrical.

15. The device according to claim 2, wherein said sieve tube is cylindrical.

16. The device according to claim 15, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

17. The device according to claim 2, further comprising an upwardly directed frustoconical insert terminating in the gas outlet opening adjoining the separation chamber and wherein said chamber is cylindrical.

18. The device according to claim 17, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

19. The device according to claim 2, wherein the geometrical dimensions of the sieve tube are within the following limits, namely $1 < l/d < 6$ and $0.5 < d/D < 2$, wherein d is the diameter of the sieve tube, D is the diameter of the exit pipe and l is the effective length of the sieve tube.

* * * * *